May 2, 1950      B. E. HOUSE      2,506,084

BRAKE

Filed Dec. 2, 1944      5 Sheets-Sheet 1

INVENTOR
BRYAN E. HOUSE
BY *T. J. Plante*
ATTORNEY

May 2, 1950  B. E. HOUSE  2,506,084
BRAKE
Filed Dec. 2, 1944  5 Sheets-Sheet 2
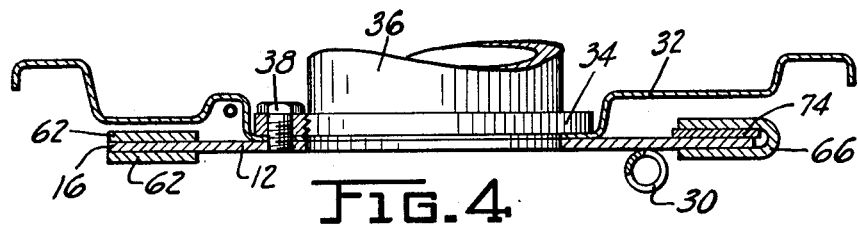
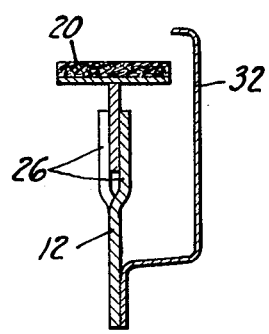
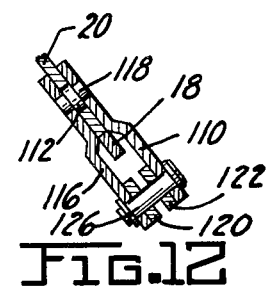
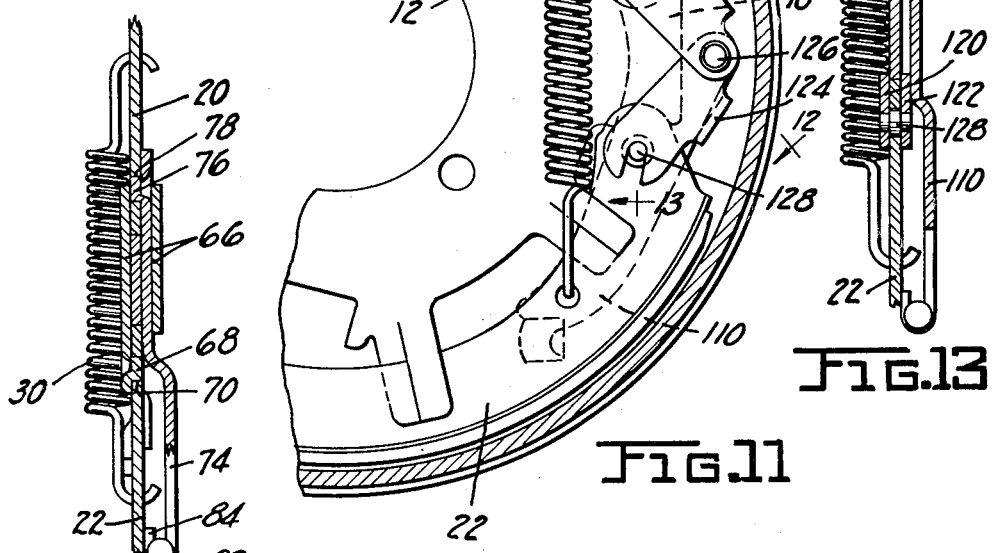
INVENTOR
BRYAN E. HOUSE
BY T. J. Plante
ATTORNEY May 2, 1950 B. E. HOUSE 2,506,084
BRAKE Filed Dec. 2, 1944 5 Sheets-Sheet 4

INVENTOR
BRYAN E. HOUSE
BY
T. J. Plante
ATTORNEY

May 2, 1950        B. E. HOUSE        2,506,084
BRAKE
Filed Dec. 2, 1944        5 Sheets-Sheet 5
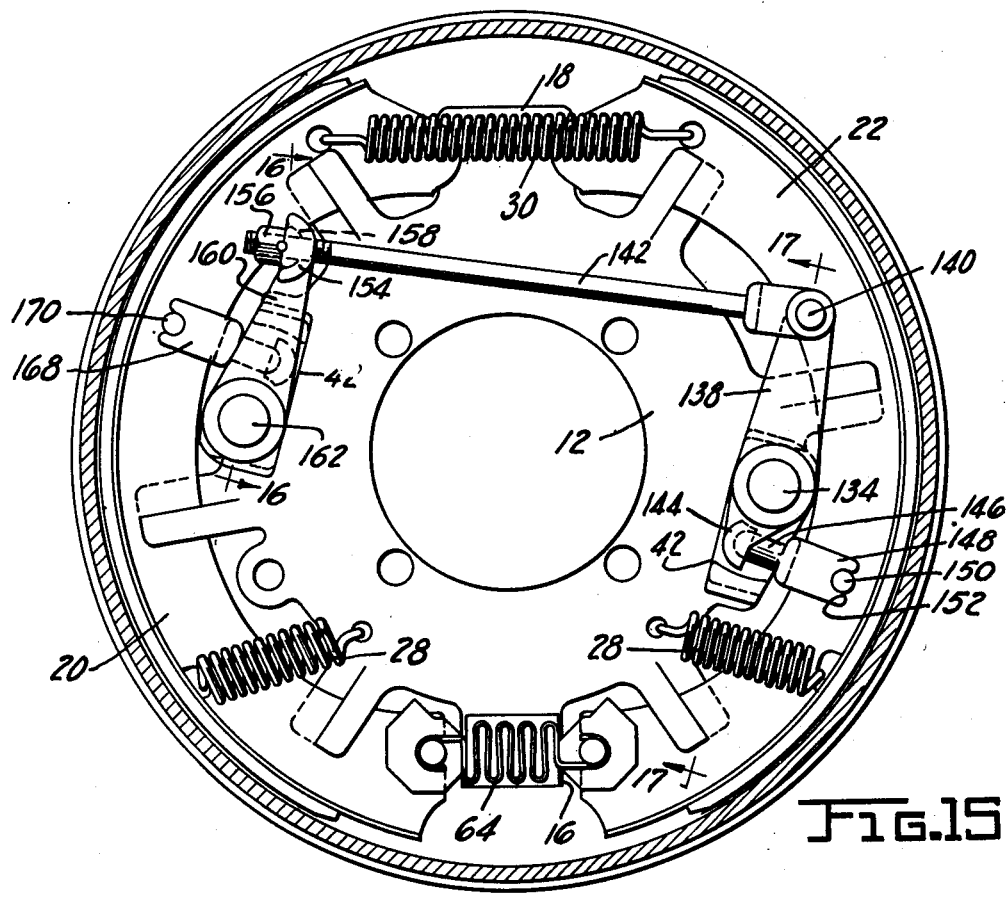
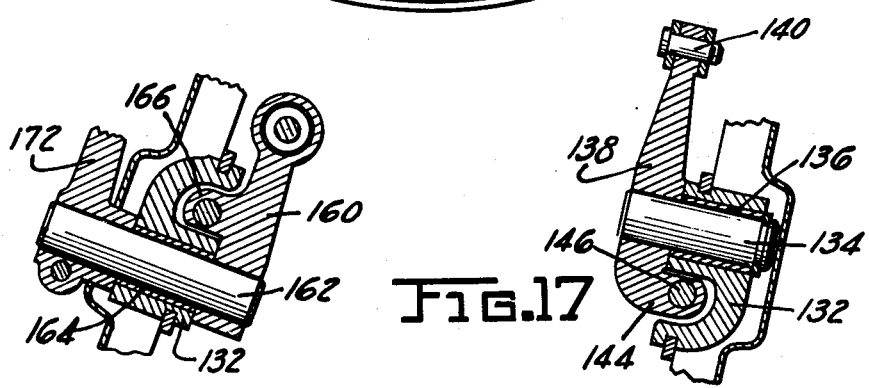
INVENTOR
BRYAN E. HOUSE
ATTORNEY Patented May 2, 1950

2,506,084

UNITED STATES PATENT OFFICE 2,506,084

BRAKE

Bryan E. House, South Bend, Ind., assignor to Bendix Aviation Corporation, South Bend, Ind., a corporation of Delaware Application December 2, 1944, Serial No. 566,274

10 Claims. (Cl. 188—78)

This invention relates to brakes, and more particularly to the construction and arrangement of the applying means and the torque reaction means which constitute parts of each brake assembly.

An object of the present invention is to provide a simplified brake construction.

Another object of the present invention is to provide a brake structure in which the anchoring and applying forces have no tendency to cause deflection or distortion of the brake support or torque reaction member.

Yet another object of the present invention is to provide a brake construction which can be adapted to several types of brake operation with a minimum change in parts.

Other objects and advantages of the present invention will become apparent during the course of the following description, reference being had therein to the accompanying drawings, in which.

Figure 1:
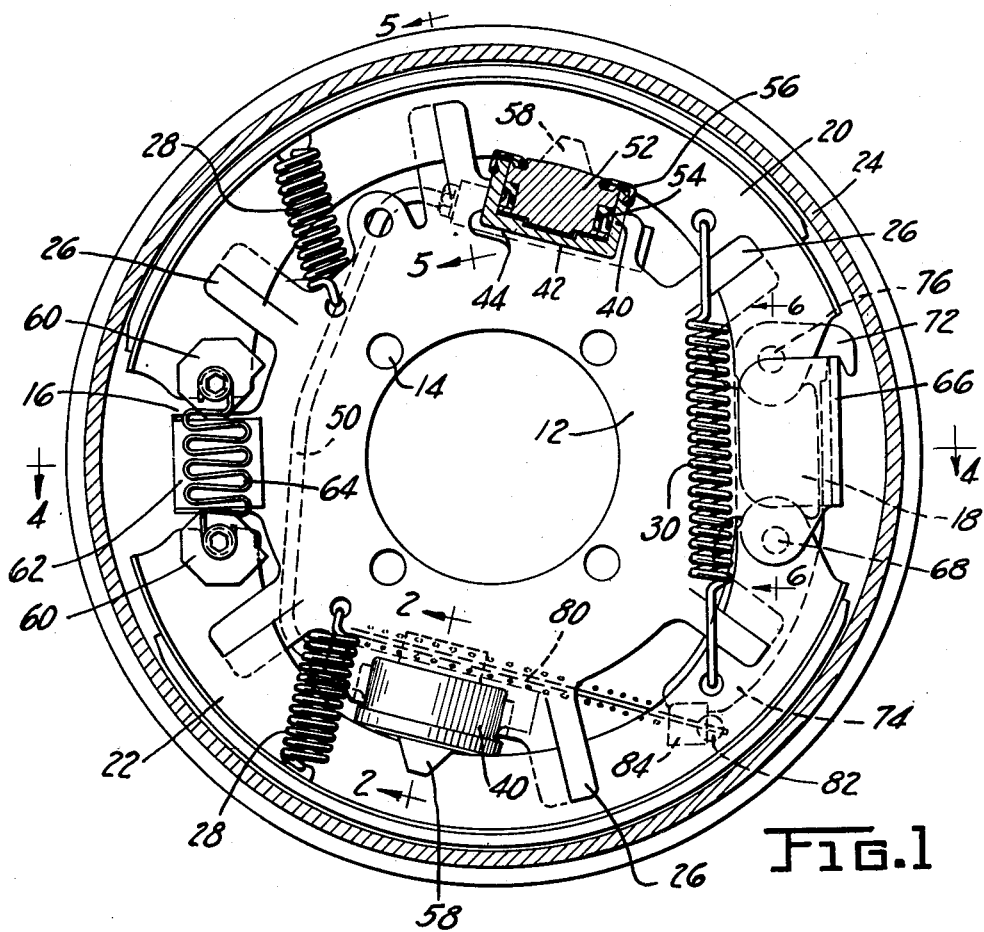
Figure 1 is a front elevation of a brake assembly, showing the structure arranged according to my invention.
Figure 2:
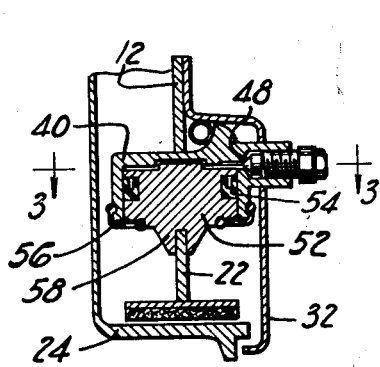
Figure 2 is a section taken on the line 2—2 of Figure 1.
Figure 14:
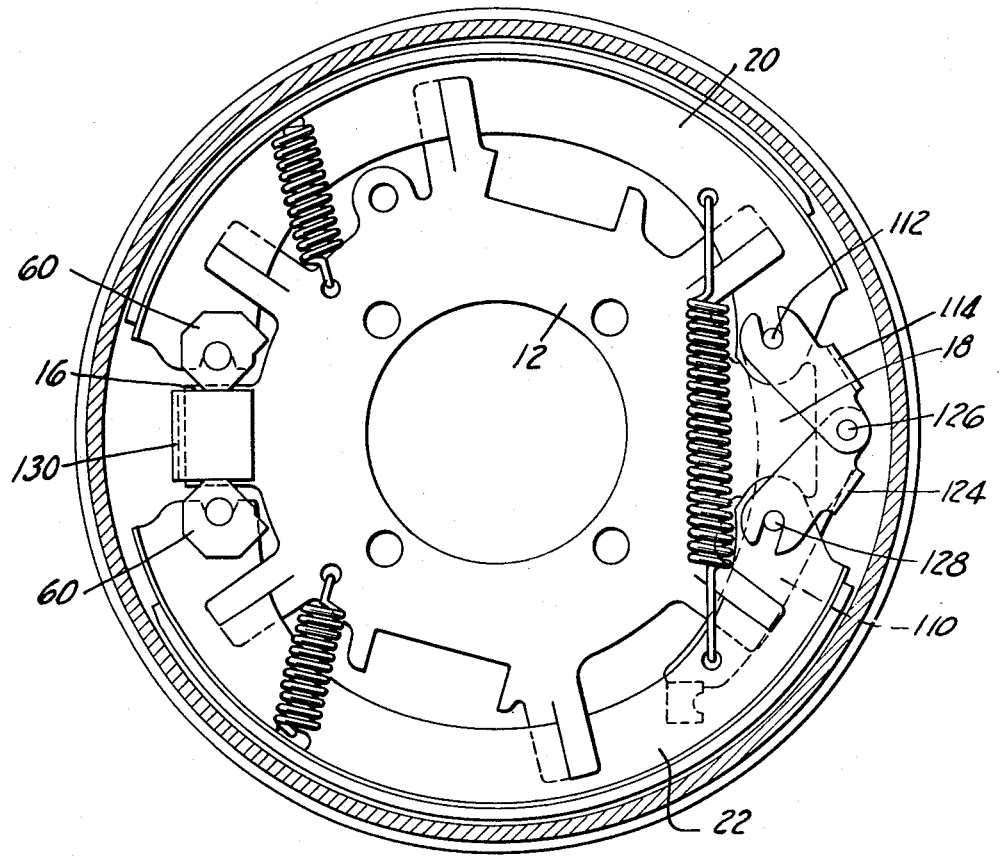

Figures 4, 5 and 6 are sections taken on the lines 4—4, 5—5 and 6—6, respectively, of Figure 1;

Figure 7 is a front elevation showing a brake assembly having certain features in common with that of Figure 1, but having a fundamentally different arrangement of the brake shoes insofar as application and anchoring thereof is concerned;

Figures 8, 9 and 10 are sections taken on the lines 8—8, 9—9 and 10—10, respectively, of Figure 7;

Figure 11 is a partial front elevation showing a brake arrangement similar to that of Figure 7, except that the brakes used are mechanically actuated rather than hydraulically actuated;

Figures 12 and 13 are sections taken on the lines 12—12 and 13—13, respectively, of Figure 11;

Figure 14 is a front elevation showing a mechanically actuated brake of a type different from any of the preceding figures, but having certain common parts;

Figure 15 is a vertical elevation showing a brake which is similar to that of Figure 1, except that mechanical actuation takes the place of hydraulic actuation; and Figures 16 and 17 are sections taken on the lines 16—16 and 17—17, respectively, of Figure 15.

Referring to Figures 1 to 6 inclusive, a support or torque reaction member 12 is provided with a plurality of openings 14, through which bolts or other suitable fastenings may extend to secure the member 12 to a fixed part of the vehicle or other structure with which the brake is associated. The torque reaction member 12 is preferably a relatively flat, plate-like member. Extending outwardly from the peripheral portion of torque reaction member 12 and located at diametrically opposite points in the brake assembly are two anchor projections 16 and 18 which are adapted to take the anchoring torque of shoes 20 and 22. In the arrangement of Figures 1 to 6 inclusive, the shoes 20 and 22, which are preferably conventionally T-shaped in cross section, are individually shiftable to anchor at either end depending upon the direction of rotation of drum 24 at the time the shoes are moved into contact with said drum. Torque reaction member 12 is also provided with a plurality of outwardly extending arms 26 which are slightly offset from the plane of member 12 in order to serve as guides for the shoes, the arms 26 preferably being arranged in pairs, one member of which extends on one side of the shoe web, and the other member of which extends on the other side of the shoe web. The shoes are normally retained in released position, in which they contact the anchors 16 and 18, by means of a pair of short return springs 28 and a longer return spring 30 connected between the shoes. In order to enclose the brake assembly, and thereby prevent excessive dirt from entering, a cover plate 32 may be provided, and may be secured to flange 34 of non-rotating member 36 by means of the same fastenings 38 which secure torque reaction member 12 to the fixed flange 34 (see Figure 4).

Figure 3:
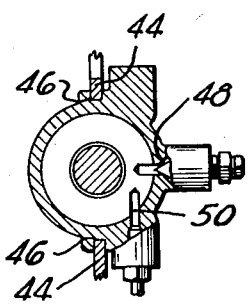
Figure 3 is a section taken on the line 3—3 of Figure 2.

Normal or service brake application is accomplished by means of two cup shaped hydraulic cylinders 40 which are located at diametrically opposite points in the brake assembly, and which fit into cradles 42 cut in the periphery of the torque reaction member 12. Projections 44, which form the sides of the cradles 42, may enter slots 46 cut in the outer walls of the cylinders, as seen in Figure 3, in order to retain the cylinders in proper lateral position. One of the cylinders is provided with the usual inlet port (not shown) connected to a fluid pressure source, and the other is provided with a bleed port 48, the cylinders being interconnected by means of conduit 50. Reciprocable in each of the cylinders 40 is a piston 52 which engages the web of the respective shoe in order to apply pressure to the same when the vehicle operator creates a pressure in the fluid in cylinders 40. The pistons are provided with the usual sealing elements 54 and rubber boots 56 for excluding dust, and are preferably each formed with a slotted extension 58 which receives the inner edge of the respective shoe web.

Adjustment of the shoes to compensate for wear is accomplished by means of two adjustors 60 which may be formed in accordance with the principles disclosed in the Goepfrich and House Patent Number 2,423,015, issued June 24, 1947, and which may butt against a pair of plates 62 secured to opposite sides of anchor projection 16. The adjustors 60 are retained against the edges of plates 62 by means of a spring 64.

In order that the brake effectivness may be somewhat greater when the vehicle is travelling forward than when it is moving in reverse, the cylinders 40 may, as shown, be located nearer one end of each shoe than the other. Thus, referring to Figure 1, when the vehicle is moving forward, the drum 24 is turning in a counterclockwise direction.

Parking or auxiliary brake applying means are included in the brake assembly. A strut 66, which may be folded over as shown in Figure 4 to hold certain parts in alignment, is provided, as shown in Figure 6, with a nib 68 which projects into an opening 70 in the web of brake shoe 22. The other end of strut 66 is in pivotal contact with the end 72 of a lever 74 which is provided with a nib 76 extending into an opening 78 formed in the web of shoe 20. A cable 80 is connected by means of an end enlargement 82 with the lower end 84 of lever 74. A pull on the cable therefore acts through lever 74 and strut 66 to spread the ends of the shoes at the right side of the brake, as viewed in Figure 1, both shoes anchoring at the left side of the brake when applied by the mechanical means.

In the arrangement of Figures 7 to 10 inclusive, the plate-like torque reaction member 12 remains the same as in Figure 1, and the hydraulic cylinders 40 and their pistons also remain the same. In addition, the auxiliary or parking brake applying means may utilize an identical construction. However, the left ends of the shoes do not anchor against anchor projection 16, as was the case in Figure 1. Instead (see Figure 8) the adjustors 60 are interconnected by means of a floating link member 86 which comprises a pair of plates 88 slidable along opposite sides of anchor projection 16 and a folded over retaining member 90 which holds plates 88 in assembly, said plates 88 having nibs 89 extending into depressions in the retaining member 90. Retaining member 90 is provided at each end with forks 92 which locate the shafts 94 of the adjustors 60.

From the preceding paragraph it is apparent that, after force has been applied to move the shoes 20 and 22 into contact with the brake drum, the well known wrapping action will cause the two shoes and link assembly 88 to move as a unit to anchor at one side or the other of anchor projection 18, depending upon the direction of drum rotation.

Since the left end of the shoes is not supported vertically by anchor projection 16 (Fig. 7), I provide an adjustable member for maintaining the vertical position of the shoes at the left side of the brake. This member may consist, as shown particularly in Figure 9, of an eccentric 96 mounted on a shaft 98 which is journaled in an opening 100 in torque reaction member 12 and in an opening 102 in cover plate 32. A lock washer 104 acting between torque reaction member 12 and a flange 106 on shaft 98 serves to maintain the eccentric 96 in adjusted position. The outer end 108 of the shaft is adapted to enter an adjusting tool.

As in Figure 1, the webs of the shoes shown in Figure 7 are preferably in the plane of the plate-like supporting member 12 in order to avoid deflection or distortion of said supporting member due to the anchoring torque of the shoes.

The arrangement of Figures 11 to 13 inclusive is similar to that of Figures 7 to 10, except that the hydraulic applying cylinders 40 are omitted, and a mechanical applying structure is used which differs from the parking brake applying means of the preceding brake assemblies. The torque reaction member 12 may again be formed the same as in Figures 1 and 7, thus making it possible to reduce tool and die costs in a plant where several of the different types of brake are manufactured. In Figure 11, the shoes 20 and 22 are arranged to shift as a unit and to anchor against anchor projection 18, in the same manner as in Figure 7.

The mechanical applying means includes a lever 110 which is pivoted to the web of shoe 20 by means of a pin 112. Preferably the upper end of lever 110 is folded over as shown at 114 to provide a side portion 116 which is on the other side of the shoe web from the main body of lever 110, as seen in Figures 12 and 13. Side portion 116 of the lever is also pivoted on pin 112, the pin preferably having reduced diameter ends 118 serving as pivots for the two forks of the lever, thereby permitting the larger diameter center portion of the pin to be held in position between the lever forks. As shown in Figure 12, the distance between forks 116 and 110 of the lever widens out to embrance the two sides 120 and 122 of a link member which is formed by being folded over as shown at 124 and which is pivotally connected to the forks of lever 110 by means of a pin 126. The other end of the link is pivotally connected to shoe 22 by means of a pin 128, the web of shoe 22 being embraced between forks 120 and 122 of the link as shown in Figure 13. Pin 128 may be constructed similarly to pin 112. The lower end of lever 110 is connected by means of member 82 with an actuating cable.

When force is exerted on lever 110 tending to rotate it in a clockwise direction, the lever, through pivot 112, exerts an outward force against shoe 20, and, through pivot 126, exerts a force on link 120, which in turn acts through pivot 128 to force the end of shoe 22 against the brake drum. The lever and link mechanism has the effect of a toggle in spreading the brake shoes. The arrangement of the applying mechanism is such that the applying force against each of the shoes is balanced, in the sense that said force is exerted on both sides of the web of each shoe through a pin which is pivotally connected at its center to the shoe web.

In Figure 14, the arrangement is the same as in Figure 11 except that the shoes 20 and 22 are permanently pivoted on the anchor projection 16. In order to accommodate the adjustors 60, a folded over member 130 may be secured to anchor projection 16. When the applying mechanism at the other side of the brake is actuated to spread the right ends of the shoes, the left ends of the shoes pivot through the adjustors on member 130 to apply in the manner of the conventional "non-servo" brake. In order to obtain maximum interchangeability, the torque reaction member 12, the return springs and the shoes may be identical with any of the preceding structures, while the applying mechanism may correspond with that shown in Figure 11.

Figures 15 to 17 inclusive show a brake assembly having individually shiftable shoes which are adapted to anchor at either end depending upon the direction of drum rotation, as was the case in the assembly of Figure 1. The primary difference between the brake shown in Figure 15 and that shown in Figure 1 is that a mechanical applying means has been substituted for the hydraulic applying means of Figure 1. The mechanical applying devices are preferably arranged to fit into the same cradles 42 formed in torque reaction member 12, in which the cylinders of Figure 1 are supported. The applying mechanism in Figures 15 to 17 comprises two shaft supporting members 132, one of which is supported in each of the cradles 42 provided in torque reaction member 12. A shaft 134 is journaled in a bushing 136 supported in the member 132 which is located at the right side of the brake assembly as seen in Figure 15. A bell crank lever is secured to the shaft 134, said lever comprising an arm 138 which is pivotally connected by means of pin 140 to a rod 142, and an arm 144 which is bent into line with the shoe web and which is in contact with the inner end 146 of a strut member having a forked outer end 148 which embraces the web of shoe 22 and receives a pin 150 in a groove 152 formed in its outer surface. The pin 150 extends through the web of shoe 22, and therefore force exerted through the strut 146 will act to move shoe 22 outwardly into contact with the brake drum. Rod 142 is provided with a knob 154 which is retained on the rod by means of a nut 156 and which is received in the concavity 158 of an arm 160 which is secured to a shaft 162 journaled in bushing 164, which is mounted in the member 132 located at the left side of the brake assembly as seen in Figure 15. A protuberance 166 formed on lever 160 is in contact with a strut 168, which corresponds to strut 146 at the opposite side of the brake, and which acts through pin 170 on the web of shoe 20. Fixed to shaft 162 at the end opposite arm 160 is another arm 172 which is connected to an operator operated member, such as a cable.

From the above description, it will be obvious that force exerted tending to rotate the arm 172 will turn shaft 162 and also arm 160, moving the latter arm in a counterclockwise direction, as viewed in Figure 15. This will cause a force to be exerted through strut 168 moving shoe 20 into contact with the brake drum. At the same time tension will be created in rod 142, thereby rotating arm 138 in a counterclockwise direction about shaft 134, exerting a force through arm 144 of the bell crank lever and strut 146 to move shoe 22 outwardly against the brake drum.

Although particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:
1. A brake structure comprising a plate-like torque reaction member secured to a fixed part of the vehicle, said member having an anchor projection extending outwardly from its periphery at one point and having a depression formed in its periphery spaced from said projection, a T-section shoe arranged to engage said anchor projection, said shoe being capable of sliding along the surface of the anchor projection, the web of said shoe lying in the plane of the torque reaction member in order that the anchoring torque of the shoe will have no tendency to bend the torque reaction member or its anchor projection away from the normal plane, said torque reaction member having a plurality of offset arms extending outwardly from its periphery to guide the shoe web, a cup-shaped hydraulic cylinder supported in the peripheral depression of the torque reaction member and having its axis extending substantially radially of the brake assembly, and a piston reciprocable in the cylinder and acting on the shoe web intermediate its ends.

2. A brake structure comprising a plate-like torque reaction member secured to a fixed part of the vehicle, said member having two diametrically arranged anchor projections extending outwardly from its periphery and two diametrically opposite depressions formed in its periphery, two arcuate T-section shoes adapted to slidably anchor either at one end or the other on one of the anchor projections, the webs of said shoes lying in the plane of the torque reaction member in order that anchoring torque of the shoes will have no tendency to bend the torque reaction member or its anchor projections away from the normal plane, said torque reaction member having a plurality of offset arms extending outwardly from its periphery to guide the shoe webs, two cup-shaped hydraulic cylinders each supported in one of the peripheral depressions of the torque reaction member and having their axes extending substantially radially of the brake assembly, and a piston reciprocable in each cylinder and acting on the web of the respective shoe intermediate its ends.

3. A brake structure comprising a plate-like torque reaction member secured to a fixed part of the vehicle, said member having two diametrically arranged anchor projections extending outwardly from its periphery, two arcuate T-section shoes adapted to slidably anchor either at one end or the other on one of the anchor projections, the webs of said shoes lying in the plane of the torque reaction member in order that anchoring torque of the shoes will have no tendency to bend the torque reaction member or its anchor projections away from the normal plane, said torque reaction member having a plurality of offset arms extending outwardly from its periphery to guide the shoe webs, and means for simultaneously exerting a substantially radial applying force on the shoes at diametrically opposite points of the brake assembly and between the ends of the respective shoes.

4. A brake comprising a plate-like torque reaction member adapted to be secured to a non-rotating member, two arcuate brake shoes carried by said torque reaction member, and each extending substantially one-half the circumference of the brake, two actuators supported by said torque reaction member, each arranged to exert a radially directed force on one of the shoes at or near the center thereof, an additional actuator adapted to force apart the ends of the shoes at one side of the brake, and adjusting means located diametrically opposite said additional actuator and adapted to change the retracted position of the shoes to take up the increased clearance caused by wear.

5. A brake comprising a plate-like torque reaction member adapted to be secured to a non-rotating member, two arcuate T-section brake shoes carried by said torque reaction member and each extending substantially one-half the circumference of the brake, the web of said shoes lying in substantially the center plane of the torque reaction member in order that the anchoring torque of the shoes will have no tendency to bend the torque reaction member, two actuators supported by said torque reaction member, each arranged to exert a radially directed force on one of the shoes at or near the center thereof, an additional actuator adapted to force apart the ends of the shoes at one side of the brake, and adjusting means located diametrically opposite said additional actuator and adapted to change the retracted position of the shoes to take up the increased clearance caused by wear.

6. A brake comprising a plate-like torque reaction member adapted to be secured to a non-rotating member, said torque reaction member having two diametrically opposed peripheral indentations, two arcuate T-section brake shoes carried by said torque reaction member and each extending substantially one-half the circumference of the brake, the webs of said shoes lying in the plane of the torque reaction member in order that the anchoring torque of the shoes will have no tendency to bend said member away from the normal plane, two cup-shaped hydraulic cylinders supported in the peripheral indentations of the torque reaction member and having axes extending substantially radially of the brake assembly, a piston reciprocable in each of said cylinders arranged to act on the web of the respective shoe at or near the center thereof, additional mechanical actuating means adapted to force apart the ends of the shoes at one side of the brake, and adjusting means located diametrically opposite said mechanical actuating means and adapted to change the released position of the shoes to take up the increased clearance caused by wear.

7. A brake structure comprising a plate-like torque reaction member secured to a fixed part of the vehicle, said member having an anchor projection extending outwardly from its periphery at one point and having a depression formed in its periphery spaced from said projection, a T-section shoe arranged to engage said anchor projection, said shoe being capable of sliding along the surface of the anchor projection, said torque reaction member having a plurality of offset arms extending outwardly from its periphery to guide the shoe web, a cup-shaped hydraulic cylinder supported in the peripheral depression of the torque reaction member and having its axis extending substantially radially of the brake assembly, and a piston reciprocable in the cylinder and acting on the shoe web intermediate its ends.

8. A brake structure comprising a plate-like torque reaction member secured to a fixed part of the vehicle, said member having two diametrically arranged anchor projections extending outwardly from its periphery and two diametrically opposite depressions formed in its periphery, two arcuate T-section shoes adapted to slidably anchor either at one end or the other on one of the anchor projections, said torque reaction member having a plurality of offset arms extending outwardly from its periphery to guide the shoe webs, two cup-shaped hydraulic cylinders each supported in one of the peripheral depressions of the torque reaction member and having their axes extending substantially radially of the brake assembly, and a piston reciprocable in each cylinder and acting on the web of the respective shoe intermediate its ends.

9. A brake structure comprising a plate-like torque reaction member secured to a fixed part of the vehicle, said member having two diametrically arranged anchor projections extending outwardly from its periphery, two arcuate T-section shoes adapted to slidably anchor either at one end or the other on one of the anchor projections, said torque reaction member having a plurality of offset arms extending outwardly from its periphery to guide the shoe webs, and means for simultaneously exerting a substantially radial applying force on the shoes at diametrically opposite points of the brake assembly and between the ends of the respective shoes.

10. A brake comprising a plate-like torque reaction member adapted to be secured to a non-rotating member, said torque reaction member having two diametrically opposed peripheral indentations, two arcuate T-section brake shoes carried by said torque reaction member and each extending substantially one-half the circumference of the brake, two cup-shaped hydraulic cylinders supported in the peripheral indentations of the torque reaction member and having axes extending substantially radially of the brake assembly, a piston reciprocable in each of said cylinders arranged to act on the web of the respective shoe at or near the center thereof, additional mechanical actuating means adapted to force apart the ends of the shoes at one side of the brake, and adjusting means located diametrically opposite said mechanical actuating means and adapted to change the released position of the shoes to take up the increased clearance caused by wear.

BRYAN E. HOUSE.

REFERENCES CITED

The following references are of record in the file of this patent:

UNITED STATES PATENTS

| Number | Name | Date |
| --- | --- | --- |
| Re. 21,380 | La Brie | Mar. 5, 1940 |
| 2,245,682 | Kerr | June 17, 1941 |
| 2,324,979 | Hatch | July 20, 1943 |